3,184,792
VARIABLE ORIFICE EXTRUSION DIE
Nicholas Dominic Commisso, Victor, N.Y., assignor to National Distillers and Chemical Corporation, New York, N.Y., a corporation of Virginia
Filed Dec. 31, 1962, Ser. No. 248,638
3 Claims. (Cl. 18—14)

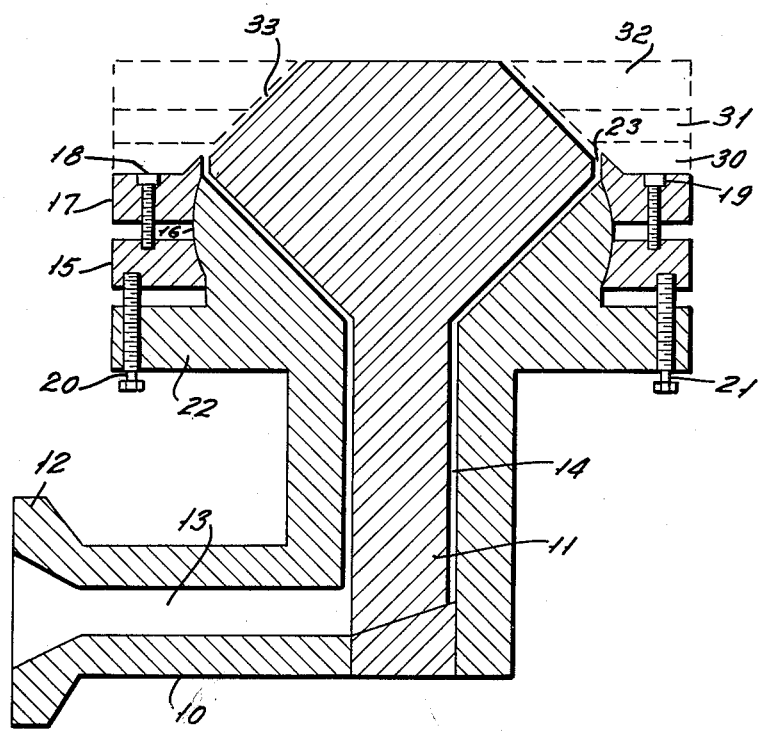
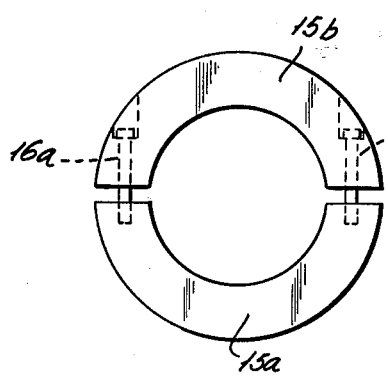

This invention relates to a novel extrusion die for the extrusion of tubular thermoplastic film, and more specifically relates to a die structure which is provided with a plurality of removable rings which make it possible to extrude several different sizes of tube by using an appropriate number of rings.

Accordingly, a primary object of this invention is to provide a novel extrusion die which can be used for the extrusion of a plurality of different diameter tubes.

Another object of this invention is to provide an extrusion die which utilizes removable ring sections for varying the diameter of the tube to be drawn.

These and other objects of this invention will become apparent from the following description when taken in connection with the drawings in which:

FIGURE 1 shows a cross-sectional view of a die construction in accordance with the present invention.

FIGURE 2 shows a plan view of the two lower collar halves of FIGURE 1.

Extrusion dies for the extrusion of thermoplastic film are well known to the art. In such dies the diameter of the die orifice through which molten thermoplastic film flow is fixed.

Where it is necessary to extrude different size plastic tubes, a completely new extrusion die structure must be placed in position in the extruding line.

Other dies have been proposed in the past wherein there is a single base or head wherein both a mandril and ring must be removed and replaced. However, a complete clean-out is required when making such a replacement.

In accordance with the present invention, a main die body is provided which can receive a plurality of different rings which form the outlet orifice of the device wherein each ring defines a different outlet diameter and thus permits the extrusion of its own respective diameter tube.

Referring now to the drawings, an extrusion die is illustrated which is comprised of a body portion 10 which has an internal mandril 11 associated therewith. The die body 11 has a flange 12 which can be connected to any appropriate extruder device which will force molten resin into the internal channel 13 at an appropriate pressure.

An annular chamber 14 which is formed between mandril 11 and die body 10 extends upwardly and flares outwardly, as shown to define a path of flow of the molten resin. A lower die ring collar 15 formed of collar halves 15a and 15b (FIGURE 2) is shaped to clamp directly on the outer curve portion 16 of die body 10 by bolts 16a and 16b. Collar 15 then receives the outer die ring 17 by means of a plurality of bolts such as bolts 18 and 19 which pass through through-type openings in ring 17 and into appropriate tapped openings in lower collar 15.

A second plurality of adjustable bolts such as bolts 20 and 21 pass through flange 22 of body 11 and into tapped openings in the lower surface of ring 15 to permit appropriate adjustment of the plane in which ring 15 will lie.

With the ring 17 in place in the manner illustrated, an outlet orifice 23 is formed which has a diameter equal to the diameter of the internal opening of ring 17.

With the die constructed in the novel manner illustrated, it has been found that a second ring illustrated in dotted lines as ring 30 can be directly secured to lower ring 17 and lower collar 15 to thereby restrict the outlet diameter of the plastic tube being extruded to the smallest internal diameter of the inwardly tapered surface of ring 30. In a similar manner, a third ring 31 could be added to the assembly to restrict the inner diameter of the tube being drawn to the innermost diameter of the inwardly tapered surface of ring 31. Finally, a fourth ring 32, could be added which further restricts the diameter of the tube being drawn.

It will be understood that each of the rings 30, 31 and 32 have inwardly tapering surfaces which cooperate with the upper tapered or conical surface 33 of the internal mandril which, for example, can form a 45° angle with respect to the axis of mandril 11. Thus, by adding additional rings to the basic ring 17, the exposed surface of conical surface 33 is restricted, whereby the tube diameter which will be drawn from the uppermost ring is also restricted.

It will be apparent that a plurality of tube sizes are now available and can be selected merely by the adding or taking away of the various rings 30, 31 and 32, or further rings which might be desired.

Although this invention has been described with respect to its preferred embodiments, many variations and modifications will now be obvious to those skilled in the art, and it is preferred, therefore, that this invention be limited in scope not by the specific disclosure herein but only by the appended claims.

What is claimed is:

1. A die structure for the extrusion of tubular thermoplastic film wherein said structure provides a variable diameter die orifice, comprising in combination, a die body; a primary passageway defined in said body, said passageway having an inlet end, and a discharge end including an outwardly flared, conically formed portion; a mandrel, including a stem and a head, adapted to be mounted in concentric radially spaced relation to said passageway walls, thereby limiting said passageway to an annular form; said mandrel head having a first right frusto-conical portion, substantially matched with said passageway conically formed portion, joined to said stem in an inverted position, and a second right frusto-conical portion joined to said first head portion at their larger base ends, said second head portion being disposed entirely beyond said primary passageway; a first die ring mounted on said die body at the discharge end of said annularly limited primary passageway, concentric therewith, said first die ring having an inner peripheral surface portion shaped to match an outer peripheral surface portion of said mandrel disposed beyond said primary passageway discharge end, and radially spaced from said mandrel surface portion, therewith to define a continuing secondary passageway portion and an annular die orifice; and a plurality of additional die rings successively and serially connected on said first die ring and on each other thereafter, each of said additional rings being removably connected to one another, each said additional ring having a tapered, conical inner surface area angularly matched to a specific portion of said mandrel second head portion, and providing therewith a continuation of said secondary passageway, and a discharge orifice; wherein, when said additional rings are serially mounted on said first die ring and on each other, said rings variably determine the outer diameter of said discharge orifice in a descending order, and when serially removed determine said orifice diameter in an ascending order.

2. A die structure according to claim 1, wherein said second right frusto-conical head portion is joined to said first head portion by a third head portion of cylindrical cross section and of a diameter equal that of the larger base ends of said first and second head portions.

3. A die structure for the extrusion of tubular thermoplastic film wherein said structure provides a variable diameter die orifice, comprising in combination, a die body; a primary passageway defined in said body; said passageway having an inlet end, and a discharge end including an outwardly flared, conically formed portion; a mandrel, including a stem and a head, adapted to be mounted in concentric radially spaced relation to said passageway walls, thereby limiting said passageway to an annular form; said mandrel head having a first right frusto-conical portion, substantially matched with said passageway conically formed portion, joined to said stem in an inverted position, and a second right frusto-conical portion joined to said first head portion at their larger base ends, said second head portion being disposed entirely beyond said primary passageway; a first die ring mounted on said die body at the discharge end of said annularly limited primary passageway, concentric therewith, said first die ring having an inner peripheral surface portion shaped to match an outer peripheral surface portion of said mandrel disposed beyond said primary passageway discharge end, and radially spaced from said mandrel surface portion, therewith to define a continuing secondary passageway portion and an annular die orifice; and connection means on said ring adapted for connection to additional ring means; said additional ring means including a plurality of additional die rings adapted for successive and serial mounting on said first die ring and on each other thereafter for providing further uniformed definition of said secondary passageway portion; each of said additional rings having a tapered, conical inner surface area angularly matched to a specific portion of said mandrel second head portion, and providing therewith a continuation of said secondary passageway, and a discharge orifice; wherein, when said additional rings are serially mounted on said first die ring and on each other, said rings variably determine the outer diameter of said discharge orifice in a descending order, and when serially removed determine said orifice diameter in an ascending order.

References Cited by the Examiner
UNITED STATES PATENTS

| | | | |
|---|---|---|---|
| 1,182,199 | 5/16 | Norris | 18—14 |
| 1,252,821 | 1/18 | Lewis | 18—12 |
| 1,679,545 | 8/28 | Roth | 18—14 |
| 2,946,090 | 7/60 | Houvener | 25—17 |
| 2,978,748 | 4/61 | McCauley et al. | 18—12 |

FOREIGN PATENTS 305,152    1/29    Great Britain.

MICHAEL V. BRINDISI, *Primary Examiner.*

WILLIAM J. STEPHENSON, *Examiner.*